(12) United States Patent
Liu et al.

(10) Patent No.: US 10,063,875 B2
(45) Date of Patent: *Aug. 28, 2018

(54) METHOD AND APPARATUS FOR COMPRESSING CODING UNIT IN HIGH EFFICIENCY VIDEO CODING

(71) Applicant: HFI Innovation Inc., Zhubei, Hsinchu County (TW)

(72) Inventors: Shan Liu, San Jose, CA (US); Yu-Wen Huang, Taipei (TW); Shaw-Min Lei, Zhubei (TW)

(73) Assignee: HFI INNOVATION INC., Zhubei, Hsinchu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/713,858

(22) Filed: Sep. 25, 2017

(65) Prior Publication Data

US 2018/0014028 A1   Jan. 11, 2018

Related U.S. Application Data

(60) Continuation of application No. 15/335,129, filed on Oct. 26, 2016, now Pat. No. 9,813,726, which is a
(Continued)

(51) Int. Cl.
*H04N 19/51* (2014.01)
*H04N 19/13* (2014.01)
(Continued)

(52) U.S. Cl.
CPC ........... *H04N 19/51* (2014.11); *H04N 19/119* (2014.11); *H04N 19/13* (2014.11); *H04N 19/157* (2014.11);
(Continued)

(58) Field of Classification Search
CPC .... H04N 19/13; H04N 19/463; H04N 19/159; H04N 19/51; H04N 19/91; H04N 19/96; H04N 19/157
See application file for complete search history.

(56) References Cited

U.S. PATENT DOCUMENTS 8,932,356 B2   1/2015   Kraus
9,049,452 B2*  6/2015   Liu .................... H04N 19/44
(Continued)

FOREIGN PATENT DOCUMENTS

CN      1747551 A    3/2006
CN    101207810 A    6/2008
(Continued)

OTHER PUBLICATIONS

International Search Report dated Apr. 12, 2012, issued in application No. PCT/CN2012/070582.
(Continued)

*Primary Examiner* — Behrooz Senfi
(74) *Attorney, Agent, or Firm* — McClure, Qualey & Rodack, LLP

(57) ABSTRACT

Methods for decoding of a video bitstream by a video decoding circuit are provided. In one implementation, a method receives coded data for a 2N×2N coding unit (CU) from the video bitstream, selects one or more first codewords according to whether asymmetric motion partition is disabled or enabled when a size of said 2N×2N CU is not equal to a smallest CU size, wherein none of the first codewords corresponds to INTER N×N partition, selects one or more second codewords when the size of said 2N×2N CU is equal to the smallest CU size, wherein none of the second codewords corresponds to the INTER N×N partition when N is 4, determines a CU structure for said 2N×2N CU from the video bitstream using said one or more first
(Continued)

codewords or said one or more second codewords, and decodes the video bitstream using the CU structure.

15 Claims, 7 Drawing Sheets

Related U.S. Application Data continuation of application No. 14/527,769, filed on Oct. 30, 2014, now Pat. No. 9,510,012, which is a division of application No. 13/272,221, filed on Oct. 13, 2011, now Pat. No. 9,049,452.

(60) Provisional application No. 61/508,825, filed on Jul. 18, 2011.

(51) Int. Cl.
| | |
|---|---|
| *H04N 19/46* | (2014.01) |
| *H04N 19/157* | (2014.01) |
| *H04N 19/96* | (2014.01) |
| *H04N 19/176* | (2014.01) |
| *H04N 19/91* | (2014.01) |
| *H04N 19/463* | (2014.01) |
| *H04N 19/119* | (2014.01) |
| *H04N 19/44* | (2014.01) |
| *H04N 19/64* | (2014.01) |
| *H04N 19/147* | (2014.01) |
| *H04N 19/159* | (2014.01) |

(52) U.S. Cl.
CPC ........... *H04N 19/176* (2014.11); *H04N 19/44* (2014.11); *H04N 19/46* (2014.11); *H04N 19/463* (2014.11); *H04N 19/91* (2014.11); *H04N 19/96* (2014.11); *H04N 19/147* (2014.11); *H04N 19/159* (2014.11); *H04N 19/647* (2014.11)

(56) References Cited

U.S. PATENT DOCUMENTS

| | | | | |
|---|---|---|---|---|
| 9,510,012 | B2* | 11/2016 | Liu | H04N 19/44 |
| 9,813,726 | B2* | 11/2017 | Liu | H04N 19/44 |
| 2011/0096834 | A1 | 4/2011 | Cheon et al. | |
| 2011/0310976 | A1 | 12/2011 | Wang et al. | |
| 2012/0082210 | A1 | 4/2012 | Chien et al. | |
| 2012/0195366 | A1 | 8/2012 | Liu et al. | |
| 2012/0320990 | A1 | 12/2012 | Chen et al. | |
| 2013/0022129 | A1 | 1/2013 | Liu | |

FOREIGN PATENT DOCUMENTS

| | | |
|---|---|---|
| CN | 101895739 A | 11/2010 |
| CN | 101938657 A | 1/2011 |
| WO | WO 2011/019250 A2 | 2/2011 |
| WO | WO 2012/044935 A1 | 4/2012 |

OTHER PUBLICATIONS

Bross, B., et al.; "WD4: Working Draft 4 of High-Efficiency Video Coding;" Joint Collaborative Team on Video Coding (JCT-VC) of ITU-T SG16 WP3 and ISO/IEC JTC1/SC29/WG11; 6th Meeting, Jul. 14-22, 2012 pp. 1-217, Document: JCTVC-F803_d6, XP030050012, Torino, IT.

McCann, K. (Samsung/Zetacast), et al.; "HM3: High Efficiency Video Coding (HEVC) Test Model 3 Encoder Description;" Joint Collaborative Team on Video Coding (JCT-VC) of ITU-T SG16 WP3 and ISO/IEC JTC1/SC29/WG11; 5th Meeting, Mar. 16-23, 2011, Document: JCTVC-E602, WG11, No. N20270 XP030009013, Geneva, CH.

Lim, J. (SK Telecom) et al.; Description of Video Coding Technology Proposal by SK Telecom, Sejong Univ and Sungkyunkwan Univ.; Joint Collaborative Team on Video Coding (JCT-VC) of ITU-T SG16 WP3 and ISO/IEC JTC1/SC29/WG11; 1st Meeting, Apr. 15-23, 2010, pp. 1-41, Document: JCTVC-A113, XP030007551, URL: http://wftp3.itu.int/av-arch/jctvc-site/, Dresden, DE.

Kim, I.K., et al; "CE2: Test results of asymmetric motion partition (AMP);" Joint Collaborative Team on Video Coding (JCT-VC) of ITU-T SG16 and ISO/IEC JTC1/SC29/WG11; Jul. 2011; pp. 1-8.

Fraunhofer HHI; "Crosscheck of NTT DOCOMO's Proposal JCTVC-D233 on Merge Improvements;" Joint Collaborative Team on Video Coding (JCT-VC) of ITU-T SG16 and ISO/IEC JTC1/SC29/WG11; Jan. 2011; pp. 1-3.

Chien, W.J., et al.; "Context reduction for CABAC;" Joint Collaborative Team on Video Coding (JCT-VC) of ITU-T SG16 and ISO/IEC JTC1/SC29/WG11; Nov. 2011; pp. 1-8.

* cited by examiner

| | | | | | |
|---|---|---|---|---|---|
| Depth = 0 | INTER 2Nx2N | INTER 2NxN | INTER Nx2N | INTRA 2Nx2N | |
| Depth = 1 | INTER 2Nx2N | INTER 2NxN | INTER Nx2N | INTRA 2Nx2N | |
| Depth = 2 | INTER 2Nx2N | INTER 2NxN | INTER Nx2N | INTRA 2Nx2N | |
| Depth = 3 | INTER 2Nx2N | INTER 2NxN | INTER Nx2N | INTRA 2Nx2N | INTRA NxN |

*Fig. 5A*

| | | | | | | |
|---|---|---|---|---|---|---|
| Depth = 0 | INTER 2Nx2N | INTER 2NxN | INTER Nx2N | INTRA 2Nx2N | | |
| Depth = 1 | INTER 2Nx2N | INTER 2NxN | INTER Nx2N | INTRA 2Nx2N | | |
| Depth = 2 | INTER 2Nx2N | INTER 2NxN | INTER Nx2N | INTRA 2Nx2N | | |
| Depth = 3 | INTER 2Nx2N | INTER 2NxN | INTER Nx2N | INTER NxN | INTRA 2Nx2N | INTRA NxN |

*Fig. 5B*

| seq_parameter_set_rbsp( ) { | Descriptor |
|---|---|
| profile_idc | u(8) |
| reserved_zero_8bits  /* equal to 0 */ | u(8) |
| level_idc | u(8) |
| ..... | |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| disable_inter_4x4_pu_flag | u(1) |
| rbsp_trailing_bits( ) | |
| } | |

*Fig. 6*

| pic_parameter_set_rbsp( ) { | Descriptor |
|---|---|
| pic_parameter_set_id | ue(v) |
| seq_parameter_set_id | ue(v) |
| ..... | |
| If(!disable_inter_4x4_pu_flag) | |
|    disable_inter_4x4_pu_pic | u(1) |
| rbsp_trailing_bits( ) | |
| } | |

*Fig. 7*

| cu_split_pred_part mode | split_coding_unit flag | skip_flag | merge_flag | PredMode | PartMode |
|---|---|---|---|---|---|
| 0 | 1 | - | - | - | - |
| 1 | 0 | 1 | - | MODE_SKIP | PART_2Nx2N |
| 2 | 0 | 0 | 1 | MODE_INTER | PART_2Nx2N |
| 3 | 0 | 0 | 0 | MODE_INTER | PART_2Nx2N |
| 4 | 0 | - | - | MODE_INTER | PART_2NxN |
| 5 | 0 | - | - | MODE_INTER | PART_Nx2N |
| 6 | 0 | - | - | MODE_INTRA | PART_2Nx2N |

*Fig. 8*

| cu_split_pred_part_mode | split_coding_unit_flag | skip_flag | merge_flag | PredMode | PartMode |
|---|---|---|---|---|---|
| 0 | 0 | 1 | - | MODE_SKIP | PART_2Nx2N |
| 1 | 0 | 0 | 1 | MODE_INTER | PART_2Nx2N |
| 2 | 0 | 0 | 0 | MODE_INTER | PART_2Nx2N |
| 3 | 0 | - | - | MODE_INTER | PART_2NxN |
| 4 | 0 | - | - | MODE_INTER | PART_Nx2N |
| 5 (escape symbol) | 0 | - | - | MODE_INTRA | PART_2Nx2N |
| | | | | MODE_INTRA | PART_NxN |
| | | | | MODE_INTER | PART_NXN |

*Fig. 9*

| cu_split_pred_part_mode | split_coding_unit_flag | skip_flag | merge_flag | PredMode | PartMode |
|---|---|---|---|---|---|
| 0 | 0 | 1 | - | MODE_SKIP | PART_2Nx2N |
| 1 | 0 | 0 | 1 | MODE_INTER | PART_2Nx2N |
| 2 | 0 | 0 | 0 | MODE_INTER | PART_2Nx2N |
| 3 | 0 | - | - | MODE_INTER | PART_2NxN |
| 4 | 0 | - | - | MODE_INTER | PART_Nx2N |
| 5 (escape symbol) | 0 | - | - | MODE_INTRA | PART_2Nx2N |
| | | | | MODE_INTRA | PART_NxN |

*Fig. 10*

METHOD AND APPARATUS FOR COMPRESSING CODING UNIT IN HIGH EFFICIENCY VIDEO CODING

CROSS REFERENCE TO RELATED APPLICATIONS

The present application is a continuation application of U.S. patent application Ser. No. 15/335,129, filed on Oct. 26, 2016, which is a continuation of U.S. patent application Ser. No. 14/527,769, filed on Oct. 30, 2014 (now U.S. Pat. No. 9,510,012, issued on Nov. 29, 2016), which is a divisional application of U.S. patent application Ser. No. 13/272,221, filed on Oct. 13, 2011, entitled "Method and Apparatus for Compressing Coding Unit in High Efficiency Video Coding" (now. U.S. Pat. No. 9,049,452, issued on Jun. 2, 2015), which claims priority to U.S. Provisional Patent Application, Ser. No. 61/508,825, filed on Jul. 18, 2011, entitled "Method and syntax for compressing coding units in HEVC". The present invention is also related to U.S. Non-Provisional patent application Ser. No. 13/012,811, filed Jan. 25, 2011, entitled "Apparatus and Method of Constrained Partition Size for High Efficiency Video Coding". The U.S. Provisional Patent Application and U.S. Non-Provisional Patent Applications are hereby incorporated by reference in their entireties.

FIELD OF THE INVENTION

The present invention relates to video processing. In particular, the present invention relates to method and apparatus for compressing coding units in High Efficiency Video Coding (HEVC).

BACKGROUND AND RELATED ART

HEVC (High Efficiency Video Coding) is an advanced video coding system being developed under the Joint Collaborative Team on Video Coding (JCT-VC) group of video coding experts from ITU-T Study Group. In HEVC, a 2N×2N coding unit can be hierarchically partitioned into a partition type selected from 2N×2N, 2N×N, N×2N and N×N. The coding system uses a criterion to determine the best partition, where RD-rate is often used as the criterion. The N×N partition at level k is evaluated and the same partition, i.e., 2N×2N partition is also evaluated at level k+1. Therefore, N×N partition at level k becomes redundant if 2N×2N partition at level k+1 will be evaluated. In order to eliminate the above redundancy, the allowable partition sizes are constrained according to the method disclosed in U.S. Non-Provisional patent application Ser. No. 13/012, 811, filed Jan. 25, 2011, entitled "Apparatus and Method of Constrained Partition Size for High Efficiency Video Coding". In U.S. Non-Provisional patent application Ser. No. 13/012,811, for each leaf CU larger than the SCU (smallest CU), the partition sizes allowed are 2N×2N, 2N×N and N×2N. In other words, the N×N partition is not allowed for INTER mode if the leaf CU is larger than the SCU. If the leaf CU size is the same as SCU size, all partition sizes, 2N×2N, 2N×N, N×2N, and N×N, are allowed. While the method disclosed in U.S. Non-Provisional patent application Ser. No. 13/012,811 reduces computational complexity at the expense of modest performance loss, it is desirable to develop a method and apparatus that can further reduce the computational complexity with about the same performance. Furthermore, it is desirable to provide flexibility so that either the method and apparatus with further complexity reduction can be selected or an alternative method and apparatus can be selected.

BRIEF SUMMARY OF THE INVENTION

A method and apparatus for decoding of a video bitstream are disclosed. In one embodiment, a method receives coded data for a 2N×2N coding unit (CU) from the video bitstream, selects one or more first codewords according to whether asymmetric motion partition is disabled or enabled when a size of said 2N×2N CU is not equal to a smallest CU size, wherein none of said one or more first codewords corresponds to INTER N×N partition, selects one or more second codewords when the size of said 2N×2N CU is equal to the smallest CU size, wherein none of said one or more second codewords corresponds to the INTER N×N partition when N is 4, determines a CU structure for said 2N×2N CU from the video bitstream using said one or more first codewords or said one or more second codewords, and decodes the video bitstream using the CU structure.

In another embodiment, a method for processing coding units of video data comprises receiving input data associated with a 2N×2N coding unit (CU); selecting one or more first codewords according to whether asymmetric motion partition is disabled or enabled when a size of said 2N×2N CU is not equal to a smallest CU size, wherein none of said one or more first codewords corresponds to INTER N×N partition; selecting one or more second codewords when the size of said 2N×2N CU is equal to the smallest CU size, wherein none of said one or more second codewords corresponds to the INTER N×N partition when N is 4; determining a CU structure for said 2N×2N CU; and encoding the CU structure using said one or more first codewords or said one or more second codewords.

In another embodiment, a non-transitory computer readable medium storing a computer-executable program is provided, wherein the computer-executable program, when executed, causing a decoder to perform the following steps: receiving coded data for a 2N×2N coding unit (CU) from the video bitstream; selecting one or more first codewords according to whether asymmetric motion partition is disabled or enabled when a size of said 2N×2N CU is not equal to a smallest CU size, wherein none of said one or more first codewords corresponds to INTER N×N partition; selecting one or more second codewords when the size of said 2N×2N CU is equal to the smallest CU size, wherein none of said one or more second codewords corresponds to the INTER N×N partition when N is 4; determining a CU structure for said 2N×2N CU from the video bitstream using said one or more first codewords or said one or more second codewords; and decoding the video bitstream using the CU structure.

BRIEF DESCRIPTION OF THE DRAWINGS

FIG. 5A illustrates an example of coding unit partition at various depths according to an embodiment of the present invention, where INTER N×N is not allowed for depth=3.

FIG. 5B illustrates an example of coding unit partition at various depths according to an embodiment of the present invention, where INTER N×N is allowed for depth=3.

FIG. 6 illustrates an example of sequence level syntax to support selection of coding unit structure and associated processing.

FIG. 7 illustrates an example of picture level syntax to support selection of coding unit structure and associated processing.

FIG. 8 illustrates an example of coding unit prediction mode and partition mode specification for coding unit size larger than the smallest coding unit size.

FIG. 9 illustrates an example of coding unit prediction mode and partition mode specification for coding unit size equal to the smallest coding unit size and the N×N partition is allowed for INTER mode.

FIG. 10 illustrates an example of coding unit prediction mode and partition mode specification for coding unit size equal to the smallest coding unit size and the N×N partition is not allowed for INTER mode.

DETAILED DESCRIPTION OF THE INVENTION

During the encoding process, in order to achieve the best possible performance, the rate-distortion function or other performance criterion usually is evaluated for various coding unit (CU) partitions and prediction unit (PU) partitions. The PU design in the current HEVC development results in some redundancy to cause rate-distortion function or other performance criterion repeatedly evaluated for some PU configuration. For example, redundancy may exist between the configuration of the INTER N×N CU at depth=k and the configuration of the INTER 2N×2N CU at depth=k+1. The redundancy will cause unnecessary processing and waste valuable system resources. A method to alleviate the redundancy is disclosed in U.S. Non-Provisional patent application Ser. No. 13/012,811, filed Jan. 25, 2011, entitled "Apparatus and Method of Constrained Partition Size for High Efficiency Video Coding", where a constrained CU partition has been developed to eliminate or reduce the redundancy in processing. Nevertheless, it is desired to develop coding unit compression method to further reduce the computational complexity. Also it is desirable to provide flexibility so that either the method and apparatus with further complexity reduction can be selected or an alternative method and apparatus can be selected. Furthermore, it is desired to design necessary syntax to convey the information related to the efficient and flexible partition between an encoder and a decoder.

Figure 1:
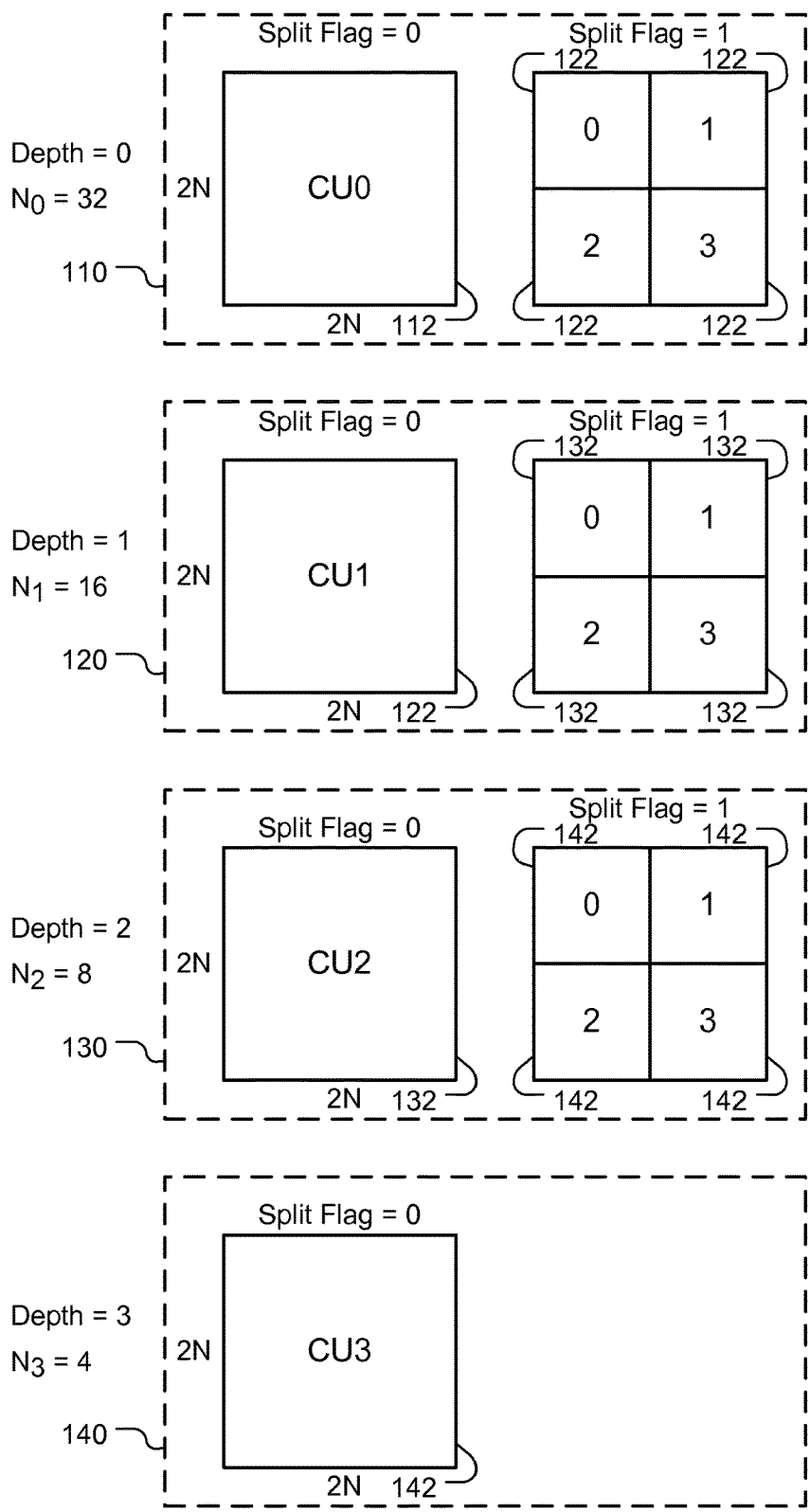
FIG. 1 illustrates an exemplary coding unit partition based on the quadtree.

In the high efficiency video coding (HEVC) system under development, the fixed-size macroblock of H.264/AVC is replaced by a flexible block, named coding unit (CU). FIG. 1 illustrates an exemplary coding unit partition based on a quadtree. At depth 0, the initial coding unit CU0, 112 consisting of 64×64 pixel, is the largest CU (LCU). The initial coding unit CU0, 112 is subject to quadtree split as shown in block 110. A split flag 0 indicates that the underlying CU is not split and, on the other hand a split flag 1 indicates the underlying CU is split into four smaller coding units CU1, 122 by the quadtree. The resulting four coding units are labeled as 0, 1, 2 and 3 and each resulting coding unit becomes a coding unit for further split in the next depth. The coding units resulted from coding unit CU0, 112 are referred to as CU1, 122. After a coding unit is split by the quadtree, the resulting coding units are subject to further quadtree split unless the coding unit reaches a pre-specified smallest CU (SCU) size. Consequently, at depth 1, the coding unit CU1, 122 is subject to quadtree split as shown in block 120. Again, a split flag 0 indicates the underlying CU is not split and, on the other hand a split flag 1 indicates the underlying CU is split into four smaller coding units CU2, 132 by the quadtree. The coding unit CU2, 132, has a size of 16×16 and the process of the quadtree splitting as shown in block 130 can continue until a pre-specified smallest coding unit is reached. For example, if the smallest coding unit is chosen to be 8×8, the coding unit CU3, 142 at depth 3 will not be subject to further split as shown in block 140. The collection of quadtree partitions of a picture to form variable-size coding units constitutes a partition map for the encoder to process the input image area accordingly. The partition map has to be conveyed to the decoder so that the decoding process can be performed accordingly.

Figure 2:
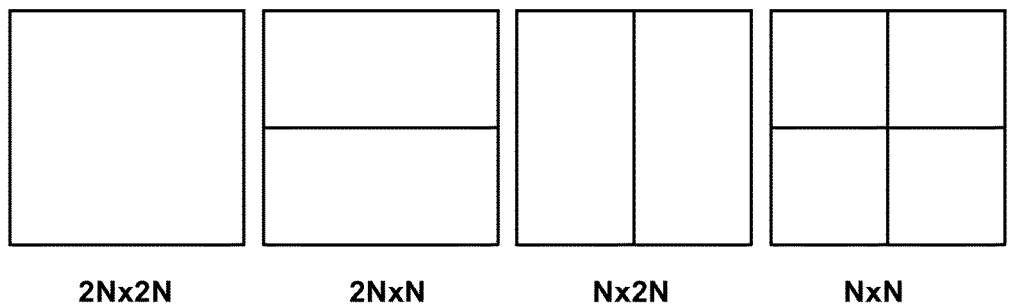
FIG. 2 illustrates allowed partition sizes of prediction unit for a 2N×2N leaf coding unit.
Figure 3:
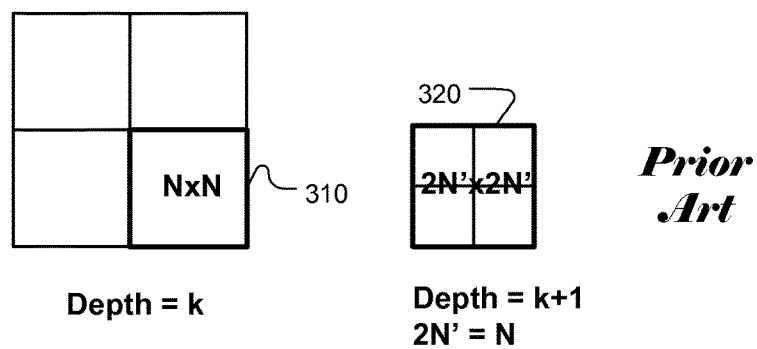
FIG. 3 illustrates an example of redundancy problem for prediction unit at depths k and k+1.

Besides the concept of coding unit, the concept of prediction unit (PU) is also introduced in HEVC. Once the splitting of CU hierarchical tree is done, each leaf CU is subject to further split into prediction units (PUs) according to prediction type and PU partition. For temporal prediction, the PU types consist of SKIP, MERGE and INTER modes. For spatial prediction modes, the PU type consists of INTRA mode. For each 2N×2N leaf CU, one partition size is selected. When the PredMode (Prediction Mode) is SKIP or MERGE, the only allowed PartSize (Partition Size) is {2N×2N}. When the PredMode is INTER, the allowed PartSize is selected from the set {2N×2N, 2N×N, N×2N, N×N} as shown in FIG. 2. When the PredMode is INTRA, the allowed PartSize is selected from the set {2N×2N, N×N}. The PU design in the current HEVC development results in some redundancy. For example, redundancy may exist between the configuration of "the PU of the CU with depth=k, Mode=INTER, PartSize=N×N" and the configuration of "the PU of the CU with depth=k+1, Mode=INTER, PartSize=2N×2N" as shown in FIG. 3. The PU 310 at depth k will be processed again at depth (k+1) as the PU 320. The PU 310 is selected under the INTER mode with partition size N×N. On the other hand, the PU 320 is selected at the INTER mode with partition size 2N'×2N', where 2N'=N. Consequently, the same block will be processed twice at depths k and depth (k+1). The redundancy will cause unnecessary processing and waste valuable system resources.

Figure 4:
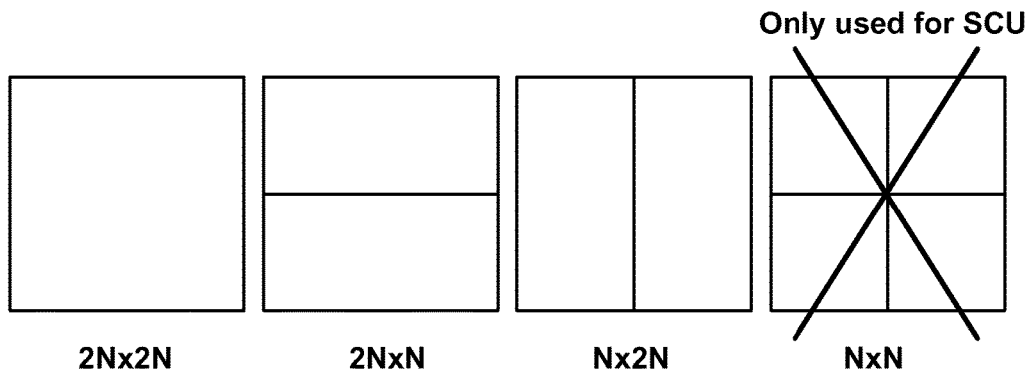
FIG. 4 illustrates an example of constrained partition set for a 2N×2N leaf coding unit to avoid redundancy for INTER prediction.

In order to eliminate the above redundancy, the allowable partition sizes are constrained according to U.S. Non-Provisional patent application Ser. No. 13/012,811, as shown in FIG. 4. Consequently, for each leaf CU larger than SCU (smallest CU), the partition sizes allowed are 2N×2N, 2N×N and N×2N. In other words, the N×N partition is not allowed for INTER mode if the leaf CU is larger than SCU. If the leaf CU size is the same as SCU size, all partition sizes, 2N×2N, 2N×N, N×2N, and N×N, are allowed. When a CU size is the same as SCU size, the CU is not subject to further split and the inclusion of N×N partition size will not cause redundancy. The partition types according to current HEVC HM3.0 (HEVC Test Model version 3.0) described above are summarized in Table 1. The codeword table associated with various partition types for HEVC HM3.0 is shown in Table 2.

TABLE 1

| Partition Types | INTER CU > SCU | INTER CU = SCU | INTRA CU > SCU | INTRA CU = SCU |
|---|---|---|---|---|
| 2N × 2N | Yes | Yes | Yes | Yes |
| N × 2N | Yes | Yes | No | No |
| 2N × N | Yes | Yes | No | No |
| N × N | No | Yes | No | Yes |

TABLE 2

| Partition type | CU > SCU | CU == SCU |
|---|---|---|
| INTER 2N × 2N | 1 | 1 |
| INTER N × 2N | 01 | 01 |
| INTER 2N × N | 001 | 001 |
| INTER N × N |  | 0001 |
| INTRA 2N × 2N | 000 | 00001 |
| INTRA N × N |  | 00000 |

While the method disclosed in U.S. Non-Provisional patent application Ser. No. 13/012,811, uses constrained PU partition to reduce the coding redundancy, the process can be further improved. According to one embodiment of the present invention, the N×N coding mode is removed for INTER coding at all depths. FIG. 5A illustrates allowed INTER and INTRA partitions in various depths according to an embodiment of the present invention. The example shown in FIG. 5A still allows INTRA N×N partition when the CU size equals to the smallest size. Since the codeword table does not need to accommodate an entry for INTER N×N regardless whether CU is larger than SCU or CU has the same size as SCU, the codeword table can be simplified. An exemplary codeword table incorporating an embodiment according to the present invention is shown in Table 3. The codewords for INTRA 2N×2N and INTRA N×N in Table 3 are shorter than the respective codewords in Table 2.

TABLE 3

| Partition type | CU > SCU | CU == SCU |
|---|---|---|
| INTER 2N × 2N | 1 | 1 |
| INTER N × 2N | 01 | 01 |
| INTER 2N × N | 001 | 001 |
| INTRA 2N × 2N | 000 | 0001 |
| INTRA N × N |  | 0000 |

In another embodiment according to the present invention, the system can adaptively eliminate the INTER N×N partition and the selection can be indicated by syntax. For example, the sequence parameter set (SPS) and picture parameter set (PPS) syntax can be modified to allow more coding flexibility. FIG. 5B illustrates allowed INTER and INTRA partitions in various depths where INTER N×N partition is allowed when the CU size equals to the smallest size. Exemplary SPS and PPS syntaxes incorporating an embodiment according to the present invention are shown in FIG. 6 and FIG. 7 respectively. In order to provide more coding flexibility, a flag "disable_inter_4×4_pu_flag" is added in SPS as highlighted in FIG. 6. In addition, a flag "disable_inter_4×4_pu_pic" may be added in PPS as highlighted in FIG. 7 to allow the encoder to selectively enable the INTER N×N when INTER N×N is allowed as indicated by "disable_inter_4×4_pu_flag" in SPS. If "disable_inter_4×4_pu_flag" is 1 in SPS, the INTER N×N (N=4) is disabled for the whole sequence. The "disable_inter_4×4_pu_pic" in PPS will not be sent in this case. Otherwise, the "disable_inter_4×4_pu_pic" in PPS will be sent to determine whether to allow INTER N×N for CU=SCU is disabled for each picture. Therefore, if "disable_inter_4×4_pu_flag" is true, then Table 3 will be used for all Inter frames in the sequence; otherwise, if "disable_inter_4×4_pu_pic" is true, then Table 3 will be used for the current Inter frame, if "disable_inter_4×4_pu_pic" is false, Table 2 will be used. The exemplary syntax design in FIG. 6 and FIG. 7 are for the purpose to illustrate one means to practice the present invention. A skilled person in the field may use other syntax design to practice the present invention without departing from the spirit of the present invention. For example, instead of "disable_inter_4×4_pu_flag", a flag "enable_inter_4×4_pu_flag", "inter_4×4_enabled_flag" or any other equivalence in SPS may also be used. Similarly, instead of "disable_inter_4×4_pu_pic", a flag "enable_inter_4×4_pu_pic", "inter_4×4_enable_pic", or any equivalence in PPS may also be used.

The coding tree semantics associated with the syntax described above are illustrated in FIG. 8 through FIG. 10. FIG. 8 illustrates specification of cu_split_pred_part_mode when CU is greater than SCU, where cu_split_pred_part_mode specifies split_coding_unit_flag and, when the coding unit is not split, the skip_flag, the merge_flag, PredMode and PartMode of a coding unit. FIG. 9 illustrates specification of cu_split_pred_part_mode when CU is equal to SCU. In FIG. 9, INTER N×N is allowed. FIG. 10 illustrates specification of cu_split_pred_part_mode when CU is equal to SCU and INTER N×N is not allowed, i.e., disable_inter_4×4_pu_flag=1 or disable_inter_4×4_pu_pic=1 according to exemplary syntax disclosed above.

When Asymmetric Motion Partitioning (AMP) is enabled, additional partitions including INTER 2N×nU, INTER 2N×nD, INTER nL×2N and INTER nR×2N, will be used. The codeword tables in Table 2 and Table 3 can be modified to accommodate the additional partitions as shown in Table 4, where the differences from Table 2 and Table 3 are shown in Italic.

TABLE 4

| Partition type | CU > SCU | CU == SCU inter_4×4 disabled | CU == SCU inter_4×4 enabled |
|---|---|---|---|
| INTER 2N × 2N | 1 | 1 | 1 |
| *INTER 2N × N* | 01*1* | 01*1* | 01*1* |
| *INTER 2N × nU* | 010*1* | 010*1* | 010*1* |
| *INTER 2N × nD* | 010*0* | 010*0* | 010*0* |
| *INTER N × 2N* | 001*1* | 001*1* | 001*1* |
| *INTER nL × 2N* | 0010*1* | 0010*1* | 0010*1* |
| *INTER nR × 2N* | 0010*0* | 0010*0* | 0010*0* |
| INTER N × N |  |  | 0001 |
| INTRA 2N × 2N | 000 | 0001 | 00001 |
| INTRA N × N |  | 0000 | 00000 |

In U.S. Non-Provisional patent application Ser. No. 13/012,811, filed Jan. 25, 2011, entitled "Apparatus and Method of Constrained Partition Size for High Efficiency Video Coding", it has been demonstrated that the method based on constrained partition size can noticeably reduce the required computations at the expense of very modest increase in RD-rates. The method incorporating an embodiment according to the present invention further selectively removes INTER N×N partition for all CU sizes to reduce computational complexity. Again, the increase in RD-rates is very modest. In another embodiment according to the present invention, a flag in SPS and/or PPS is used to select whether INTER 4×4 is allowed. If INTER 4×4 is allowed, the coding method for CU/PU partition similar to that of U.S. Non-Provisional patent application Ser. No. 13/012,811 is selected. If INTER 4×4 is not allowed, the method with further reduced computational complexity as disclose herein is used.

Embodiment of compressing CU partition with INTER 4×4 removed according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope

The invention claimed is:

1. A method for decoding of a video bitstream by a video decoding circuit, the method comprising:
   receiving coded data for a 2N×2N coding unit (CU) from the video bitstream;
   selecting one or more first codewords according to whether asymmetric motion partition is disabled or enabled when a size of said 2N×2N CU is not equal to a smallest CU size, wherein none of said one or more first codewords corresponds to INTER N×N partition;
   selecting one or more second codewords when the size of said 2N×2N CU is equal to the smallest CU size, wherein none of said one or more second codewords corresponds to the INTER N×N partition when N is 4;
   determining a CU structure for said 2N×2N CU from the video bitstream using said one or more first codewords or said one or more second codewords; and
   decoding the video bitstream using the CU structure.

2. The method of claim 1, further comprises:
   receiving an indication from the video bitstream regarding whether the asymmetric motion partition is disabled or enabled.

3. The method of claim 1, wherein said one or more first codewords correspond to INTER 2N×2N partition, INTER N×2N partition, and INTER 2N×N partition when the asymmetric motion partition is disabled, wherein said one or more first codewords correspond to INTER 2N×2N partition, INTER 2N×N partition, INTER 2N×nU partition, INTER 2N×nD partition, INTER N×2N partition, INTER nL×2N partition, and INTER nR×2N partition when the asymmetric motion partition is enabled.

4. The method of claim 1, wherein said one or more first codewords correspond to INTER 2N×2N partition, INTER N×2N partition, INTER 2N×N partition when the asymmetric motion partition is disabled and the size of said 2N×2N CU is larger than the smallest CU size, wherein said one or more first codewords correspond to INTER 2N×2N partition, INTER 2N×N partition, INTER 2N×nU partition, INTER 2N×nD partition, INTER N×2N partition, INTER nL×2N partition, and INTER nR×2N partition when the asymmetric motion partition is enabled and the size of said 2N×2N CU is larger than the smallest CU size.

5. The method of claim 1, wherein said one or more first codewords and said one or more second codewords are used for entropy decoding based on CABAC (Context-Adaptive Binary Arithmetic Coding) or CAVLC (Context-Adaptive Variable-Length Coding).

6. A method of processing coding units of video data by a video encoding circuit, the method comprising:
   receiving input data associated with a 2N×2N coding unit (CU);
   selecting one or more first codewords according to whether asymmetric motion partition is disabled or enabled when a size of said 2N×2N CU is not equal to a smallest CU size, wherein none of said one or more first codewords corresponds to INTER N×N partition;
   selecting one or more second codewords when the size of said 2N×2N CU is equal to the smallest CU size, wherein none of said one or more second codewords corresponds to the INTER N×N partition when N is 4;
   determining a CU structure for said 2N×2N CU; and
   encoding the CU structure using said one or more first codewords or said one or more second codewords.

7. The method of claim 6, further comprises:
   determining whether the asymmetric motion partition is disabled or enabled; and
   transmitting an indication in a video bitstream regarding whether the asymmetric motion partition is disabled or enabled.

8. The method of claim 6, wherein said one or more first codewords correspond to INTER 2N×2N partition, INTER N×2N partition, and INTER 2N×N partition when the asymmetric motion partition is disabled, wherein said one or more first codewords correspond to INTER 2N×2N partition, INTER 2N×N partition, INTER 2N×nU partition, INTER 2N×nD partition, INTER N×2N partition, INTER nL×2N partition, and INTER nR×2N partition when the asymmetric motion partition is enabled.

9. The method of claim 6, wherein said one or more first codewords correspond to INTER 2N×2N partition, INTER N×2N partition, INTER 2N×N partition when the asymmetric motion partition is disabled and the size of said 2N×2N CU is larger than the smallest CU size, wherein said one or more first codewords correspond to INTER 2N×2N partition, INTER 2N×N partition, INTER 2N×nU partition, INTER 2N×nD partition, INTER N×2N partition, INTER nL×2N partition, and INTER nR×2N partition when the asymmetric motion partition is enabled and the size of said 2N×2N CU is larger than the smallest CU size.

10. The method of claim 6, wherein said one or more first codewords and said one or more second codewords are used for entropy encoding based on CABAC (Context-Adaptive Binary Arithmetic Coding) or CAVLC (Context-Adaptive Variable-Length Coding).

11. A non-transitory computer readable medium storing a computer-executable program, the computer-executable program, when executed, causing a decoder to perform the following steps:
   receiving coded data for a 2N×2N coding unit (CU) from the video bitstream;
   selecting one or more first codewords according to whether asymmetric motion partition is disabled or enabled when a size of said 2N×2N CU is not equal to a smallest CU size, wherein none of said one or more first codewords corresponds to INTER N×N partition;
   selecting one or more second codewords when the size of said 2N×2N CU is equal to the smallest CU size, wherein none of said one or more second codewords corresponds to the INTER N×N partition when N is 4;
   determining a CU structure for said 2N×2N CU from the video bitstream using said one or more first codewords or said one or more second codewords; and
   decoding the video bitstream using the CU structure.

12. The non-transitory computer-readable medium of claim 11, wherein the decoder is further configured by the computer-executable program to receive an indication from the video bitstream regarding whether the asymmetric motion partition is disabled or enabled.

13. The non-transitory computer-readable storage medium of claim 11, wherein said one or more first codewords correspond to INTER 2N×2N partition, INTER N×2N partition, and INTER 2N×N partition when the asymmetric motion partition is disabled, wherein said one or more first codewords correspond to INTER 2N×2N partition, INTER 2N×N partition, INTER 2N×nU partition, INTER 2N×nD partition, INTER N×2N partition, INTER nL×2N partition, and INTER nR×2N partition when the asymmetric motion partition is enabled.

14. The non-transitory computer-readable medium of claim 11, wherein said one or more first codewords correspond to INTER 2N×2N partition, INTER N×2N partition, INTER 2N×N partition when the asymmetric motion partition is disabled and the size of said 2N×2N CU is larger than the smallest CU size, wherein said one or more first codewords correspond to INTER 2N×2N partition, INTER 2N×N partition, INTER 2N×nU partition, INTER 2N×nD partition, INTER N×2N partition, INTER nL×2N partition, and INTER nR×2N partition when the asymmetric motion partition is enabled and the size of said 2N×2N CU is larger than the smallest CU size.

15. The non-transitory computer-readable medium of claim 11, wherein said one or more first codewords and said one or more second codewords are used for entropy decoding based on CABAC (Context-Adaptive Binary Arithmetic Coding) or CAVLC (Context-Adaptive Variable-Length Coding).

* * * * *